(12) United States Patent
Feinaeugle et al.

(10) Patent No.: US 10,430,359 B2
(45) Date of Patent: Oct. 1, 2019

(54) USE OF AN IO LINK FOR LINKING FIELD DEVICES

(71) Applicant: Balluff GmbH, Neuhausen a. d. F (DE)

(72) Inventors: Albert Feinaeugle, Wildberg (DE); Juergen Gutekunst, Nuertingen (DE)

(73) Assignee: Balluff GmbH, Neuhausen a. d. F (DE)

( * ) Notice: Subject to any disclaimer, the term of this patent is extended or adjusted under 35 U.S.C. 154(b) by 260 days.

(21) Appl. No.: 14/404,087

(22) PCT Filed: May 16, 2013

(86) PCT No.: PCT/DE2013/000270
§ 371 (c)(1),
(2) Date: Nov. 26, 2014

(87) PCT Pub. No.: WO2013/178209
PCT Pub. Date: Dec. 5, 2013

(65) Prior Publication Data
US 2015/0143009 A1    May 21, 2015

(30) Foreign Application Priority Data

May 29, 2012  (DE) .......... 10 2012 010 384
Jul. 25, 2012  (DE) .......... 10 2012 014 681

(51) Int. Cl.
| | | |
|---|---|---|
| *G06F 13/38* | (2006.01) | |
| *G05B 19/042* | (2006.01) | |
| *G06F 13/364* | (2006.01) | |

(52) U.S. Cl.
CPC ....... *G06F 13/387* (2013.01); *G05B 19/0425* (2013.01); *G06F 13/364* (2013.01)

(58) Field of Classification Search
None
See application file for complete search history.

(56) References Cited

U.S. PATENT DOCUMENTS

| | | |
|---|---|---|
| 7,496,707 B2 | 2/2009 | Freking et al. |
| 7,668,990 B2 | 2/2010 | Krzyzanowski et al. |
| 7,870,299 B1 | 1/2011 | Sorensen et al. |
| 8,814,233 B2 | 8/2014 | Leska et al. |
| 9,244,454 B2 | 1/2016 | Neupärtl et al. |
| 2004/0107265 A1 | 6/2004 | Yasunaga |
| 2004/0230323 A1* | 11/2004 | Glanzer .................. G05B 9/02 700/18 |
| 2004/0260405 A1 | 12/2004 | Eddie et al. |
| 2006/0142876 A1 | 6/2006 | Kalhoff et al. |
| 2007/0011365 A1 | 1/2007 | Jurisch et al. |

(Continued)

FOREIGN PATENT DOCUMENTS

| | | |
|---|---|---|
| CN | 1591250 A | 3/2005 |
| CN | 1802612 A | 7/2006 |

(Continued)

OTHER PUBLICATIONS

Chinese Office Action in CN 201380031645.5, dated Mar. 18, 2016, with English translation.

(Continued)

*Primary Examiner* — Henry Tsai
*Assistant Examiner* — Aurangzeb Hassan
(74) *Attorney, Agent, or Firm* — Collard & Roe, P.C.

(57) ABSTRACT

The invention relates to the use of an IO link for linking a field device to a master assembly.

2 Claims, 1 Drawing Sheet

(56) References Cited

U.S. PATENT DOCUMENTS

| | | | |
|---|---|---|---|
| 2009/0083446 | A1 | 3/2009 | Konieczny et al. |
| 2009/0125666 | A1 | 5/2009 | Freking et al. |
| 2009/0276180 | A1 | 11/2009 | Schneider et al. |
| 2010/0114334 | A1 | 5/2010 | Krumsiek |
| 2010/0146182 | A1 | 6/2010 | Gutekunst et al. |
| 2010/0191875 | A1 | 7/2010 | Beyer et al. |
| 2012/0110225 | A1* | 5/2012 | Wessling ............ G04G 5/00 710/61 |
| 2012/0210037 | A1 | 8/2012 | Kiesel et al. |
| 2012/0296446 | A1 | 11/2012 | Neupaertl et al. |
| 2013/0111087 | A1 | 5/2013 | Kaufleitner |
| 2013/0222123 | A1* | 8/2013 | Wessling ......... G05B 19/0423 340/12.22 |
| 2014/0214232 | A1 | 7/2014 | Koppmann et al. |
| 2014/0336792 | A1 | 11/2014 | Stamberg et al. |
| 2015/0121507 | A1 | 4/2015 | Haija et al. |

FOREIGN PATENT DOCUMENTS

| | | |
|---|---|---|
| CN | 101124530 A | 2/2008 |
| CN | 101132361 A | 2/2008 |
| CN | 1011244530 A | 2/2008 |
| CN | 101562559 A | 10/2009 |
| CN | 101826966 A | 9/2010 |
| CN | 201837860 U | 5/2011 |
| DE | 102 59 391 A1 | 7/2004 |
| DE | 10 2004 015 227 A1 | 10/2005 |
| DE | 10 2008 038 417 A1 | 2/2010 |
| DE | 10 2008 062 851 B3 | 4/2010 |
| DE | 10 2008 060 004 B4 | 5/2010 |
| DE | 10 2008 060 006 B4 | 5/2010 |
| DE | 10 2009 013 303 A1 | 9/2010 |
| DE | 20 2008 017 894 U1 | 10/2010 |
| DE | 10 2010 038 457 A1 | 2/2012 |
| DE | 10 2011 081 766 A1 | 2/2013 |
| EP | 1 884 844 A1 | 2/2008 |
| EP | 2 161 638 A1 | 3/2010 |
| EP | 2 187 278 A1 | 5/2010 |
| EP | 2 211 523 A1 | 7/2010 |
| GB | 2 403 042 A | 12/2004 |
| WO | 2011/047772 A1 | 4/2011 |

OTHER PUBLICATIONS

International Search Report of PCT/DE2013/000280, dated Sep. 11, 2013.
International Search Report of PCT/DE2013/000255, dated Oct. 22, 2013.
IEC 61131-9, International Standard, "Programmable controllers—Part 9: Single-drop digital communication interface for small sensors and actuators (SDCI)," Edition 1.0, Sep. 2013, total of 576 pages.
Profibus Nutzerorganisation E.V. PNO, "PROFIsafe System Description Technology and Application", Internet Citation, Nov. 2010, pp. 1-26.
English translation of Chinese Office Action, including Search Report, dated Apr. 19, 2016 in Chinese Application No. 201380032743.0.
German Examination Report dated Jul. 19, 2016 in German Application No. 10 2012 014 682.5, with English translation of relevant parts.
ISO 15745-1, Industrial automation systems and integration—Open systems application integration framework—Part 1: Generic reference description, First edition Mar. 1, 2003.
ISO 15745-1, Industrial automation systems and integration—Open systems application integration framework—Part 1: Generic reference description, First edition Mar. 1, 2003, Amendment 1 (Apr. 1, 2007).
ISO 15745-2, Industrial automation systems and integration—Open systems application integration framework—Part 2: Reference description for ISO 11898-based control systems, First edition Nov. 15, 2003.
ISO 15745-3, Industrial automation systems and integration—Open systems application integration framework—Part 3: Reference description for IEC 61158-based control systems, First edition Nov. 15, 2003.
ISO 15745-4, Industrial automation systems and integration—Open systems application integration framework—Part 4: Reference description for Ethernet-based control systems, First edition Nov. 15, 2003.
ISO 15745-4, Industrial automation systems and integration—Open systems application integration framework—Part 4: Reference description for Ethernet-based control systems, First edition Nov. 15, 2003, Amendment 1: PROFINET profiles (Feb. 15, 2006).
ISO 15745-4, Industrial automation systems and integration—Open systems application integration framework—Part 4: Reference description for Ethernet-based control systems, First edition Nov. 15, 2003, Amendment 2: Profiles for Modbus TCP, EtherCAT and ETHERNET powerlink (Feb. 1, 2007).
ISO 15745-5, Industrial automation systems and integration—Open systems application integration framework—Part 5: Reference description for HDLC-based control systems, First edition Feb. 1, 2007.
Chinese Office Action in CN201380032745, dated Dec. 23, 2016.
German Office Action dated Jun. 28, 2016 in German Application No. 10 2012 014 681.7 with English translation of relevant parts.
"IO-Link System Description—Technology and Application" downloaded from www.io-link.com, Feb. 2016, total of 20 pages.
Second Chinese Office Action in CN201380032743.0, dated Dec. 30, 2016.
Second Chinese Office Action in CN201380032745.X, dated Aug. 21, 2017.
Third Chinese Office Action in CN201380032743.0, dated Jun. 26, 2017.
IO-Link Communication Specification Version 1.0, Jan. 2009, cover sheet.
Notification of the Office Rejection in CN 201380032743.0, dated Jul. 11, 2018.
International Search Report of PCT/DE2013/000270, dated Oct. 22, 2013.

* cited by examiner

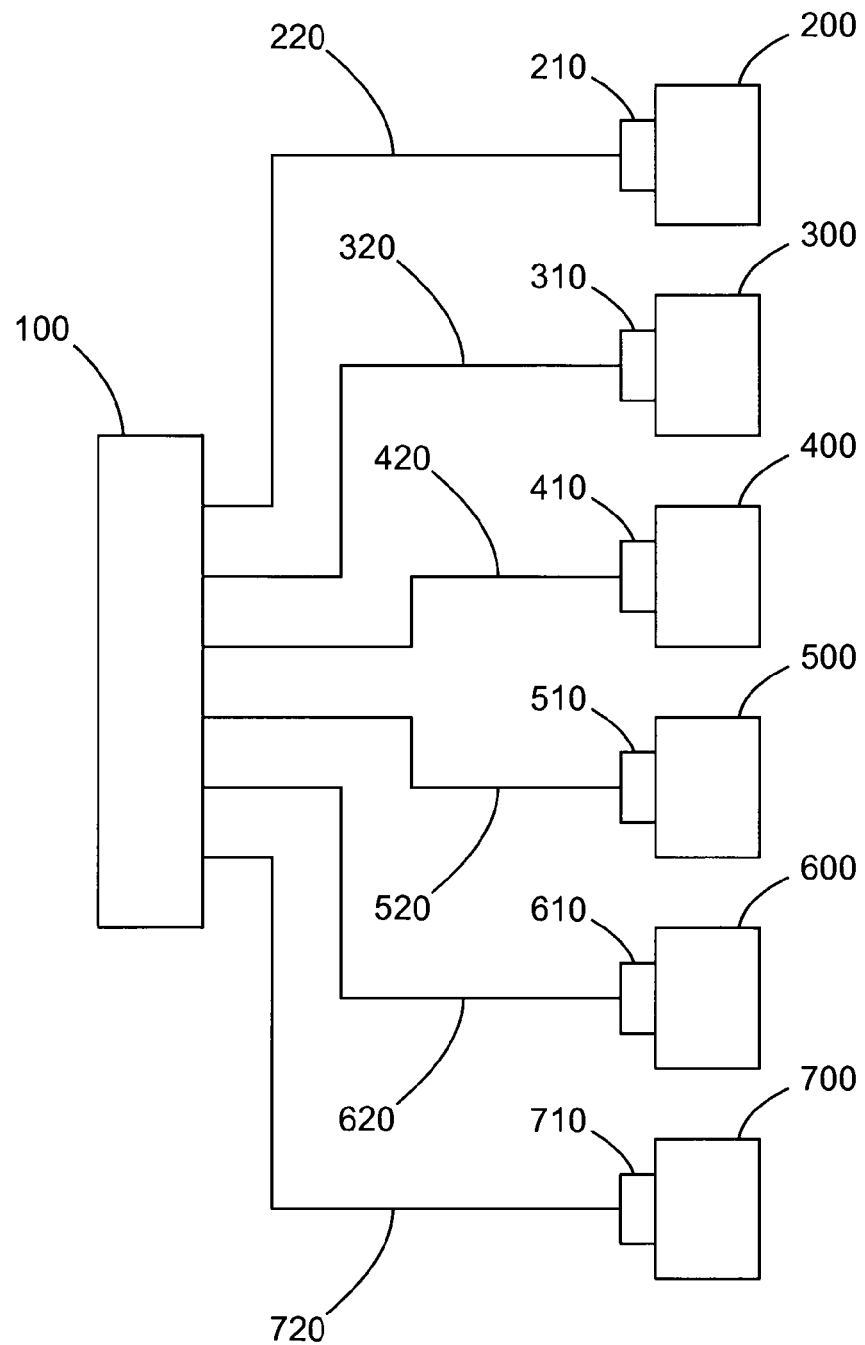

USE OF AN IO LINK FOR LINKING FIELD DEVICES

CROSS REFERENCE TO RELATED APPLICATIONS

This application is the National Stage of PCT/DE2013/000270 filed on May 16, 2013, which claims priority under 35 U.S.C. § 119 of German Application Nos. 10 2012 010 384.0 filed on May 29, 2012, and 10 2012 014 681.7 filed on Jul. 25, 2012, the disclosures of which are incorporated by reference. The international application under PCT article 21(2) was not published in English.

The invention relates to the use of an IO link.

STATE OF THE ART

In the field of machinery and plant engineering as well as in automation engineering numerous standardized field bus systems have proven to provide good alternatives to parallel individual wiring. Here, a plurality of so-called field bus modules is connected to a central control device via a field bus. In turn, terminal devices are connected to the field bus modules. More recently, IO link connections have been used for connecting the terminal devices to the field bus modules. When this is done, the field bus modules take over the function of the IO link master. Terminal devices can be sensors, actuators, display devices, operator devices or smaller drives in machines, for example. In many assembly facilities the space requirements for the cabling/wiring and the switch box for the electrical installation often exceed the installation space of the mechanical handling system. Almost always the costs for the work hours as well as for the material required for the installation of the hardware for signal transmission to the machine exceed the purchasing costs of the connected binary sensors and actuators. For this reason, with view to avoiding an expensive and complicated wiring and to reducing costs, sensors with analog signals or serial interfaces, parameterizable multi-channel sensors or devices having diagnostic functions are often dispensed with, even if it would actually be favourable to use them.

In order to tackle this problem, a consortium of involved manufacturers has specified a new standard for a more intelligent sensor/actuator interface which is called "IO link". It is planned to standardize IO link as an international open standard in the norm IEC 61131-9. IO link devices are described through description files IODD, IO link device description. As a description language, IODD is to be standardized as an open standard in the norm ISO 15745. An IO link is a serial point-to-point connection for signal transmission between sensors and actuators and the IO level of the machine. In principle, IO link transmits data between an IO link master and a connected IO link device as the slave. Field bus modules as well as SPS interface assembly are available to be used as an IO link master. IO link is downward compatible to binary standard sensors and generally uses unshielded three or five-wire standard cables. While the field bus level is responsible for interconnecting individual machines or their components with the control system of the plant, the IO link is assigned to the machine or sensor actuator level. The field bus level comprises most of the standardized field busses such as are generally used in machinery and plant engineering. Commonly used field busses are, for example, PROFIBUS-DP, Interbus, DeviceNet, CC-Link and CANopen. More recently, also Ethernet-based field bus standards such as PROFINET, EtherNet/IP, EtherCAT as well as Ethernet POWERLINK have been used. Field busses are used in a particularly advantageous manner for the purpose of bridging greater distances between individual participants, which can lie between several 100 meters up to sometimes more than 10 km. However, it poses a problem and disadvantage that it is practically impossible to use these high-performance bus systems in an economically viable manner on the sensor/actuator level.

Apart from the purely functional signals, there are also always signals to be found in a machine which are related to safety and which serve for providing security for people as well as for the appliance. Commonly used safe signals come from safety devices and safety switches, such as door safety switches, door lock switch devices, light curtains, emergency stop switches etc. In the following, the term "security devices" always refers to such safety devices and safety switches.

From DE 10 2009 013 303 A1, the use [of] IO links for linking so-called IO link devices has become known. These are sensors and actuators that are per se known. The linking of further field devices, particularly such field devices that are relevant with regard to safety or such field devices that require parametrization, is still carried out in a conventional manner according to the state of the art, meaning by way of direct linking to the field bus. The invention is now based on the objective to also further simplify the linking and automatization of other field devices and especially also such field devices that are relevant with regard to safety, and particularly to further simplify the installation requirements. Furthermore, the communication between the master assembly and the field devices is to be simplified and optimized, as well.

DISCLOSURE OF THE INVENTION

Advantages of the Invention

According to the invention, this task is solved by using an IO link for linking a field device to a master assembly.

The IO link is advantageously used to connect one or multiple of the following field devices to the master assembly:
drives and frequency converters;
display and operator devices (HMI);
image recognition systems;
power supply units;
door safety switches;
safety-related light curtains.

With view to simplifying the installation process, enhancing functionality, providing an automatable parametrization of the devices and enhancing the possibilities of identification and diagnostics, while at the same time avoiding the need to increase expenditures for material and installation, one advantageous embodiment provides that at least one device status and/or at least one bit of process data is transmitted to or from a device and/or at least one diagnostic information and/or at least one parameter is transmitted via the IO link. Particularly if power supply units are connected via the IO link, turning off the output voltage, and also the safety-related turning off of individual or multiple output voltages, is possible.

In order to also facilitate the linking of safety devices in an easy manner, what is envisioned here is performing a bidirectional transfer of a safety protocol between the field device and the master assembly via the IO link. Here, the safety protocol is advantageously transferred via IO link data bits, so that the IO link connection serves as a black channel.

Preferably, the energy transfer, too, is taking place via the IO link. Here, linking of the field devices to the master assembly is carried out via IO link interfaces or IO link adapters. The advantage of using an IO link for the purpose of linking to field devices can especially be seen in the fact that it allows for automatable parametrization, makes it possible to carry out diagnoses and to use identification data of the field devices and moreover facilitates performing safety installations in a technically simple and also cost-effective manner without requiring additional expenditure for the device itself or during installation. What is especially advantageous is the simplification of the cabling, since IO link devices are connected via standardized tree- or five-wire cables.

Through the use of IO link adapters, field devices that are per se known, such as drive and frequency converters, display devices and operator units (HMI), image recognition systems, power supply units, door safety switches with or without locking function, and safety-related light curtains, can be connected to the master assembly in an advantageous manner.

SHORT DESCRIPTION OF THE DRAWING

Embodiments of the invention are shown in the drawing and are described in more detail in the following description.

FIG. 1 shows a schematic representation of the connection of field devices to a master assembly by means of IO link adapters.

EMBODIMENTS OF THE INVENTION

FIG. 1 shows a schematic representation of a master assembly 100 to which field devices as they are described in the following are connected. A drive and/or a frequency converter 200 is connected to the master assembly via an external IO link adapter or an integrated IO link interface 210 and an IO link connection 220. A display and operator device 300 is connected to the master assembly 100 via an external IO link adapter or an integrated IO link interface 310 and an IO link connection 320. An image recognition system 400 is connected to the master assembly 100 via an external IO link adapter or an integrated IO link interface 410 and an IO link connection 420. A power supply unit 500 is connected to the master assembly 100 via an external IO link adapter or an integrated IO link interface 510 and an IO link connection 520. In addition, security-related field devices, such as door safety switches with or without a locking function 600, are connected to the master assembly 100 via an external IO link adapter or an integrated IO link interface 610 and an IO link connection 620. A safety-related light curtain 700 is connected to the master assembly 100 via an external IO link adapter or an integrated IO link interface 710 and an IO link connection 720. Safety-related signals are transmitted in a bidirectional manner between the last-mentioned devices and the master assembly 100. This can be realized by using the IO link data bits, which are transferred via the per se known IO link protocol, in such a manner that they serve as a so-called black channel, through which safety protocols with a data bit set typical for such a safety protocols are transmitted. For this purpose, data bit areas of the IO link data bits are used for the transmission of the safety protocol. In this manner, an IO link connection that is per se known can be used for the transmission of a safety protocol without having to modify the IO link connection in any way, and also without the IO link connection "realizing" that the transmission of the safety protocol is taking place. It is quasi used as a transparent channel which is also referred to as a "black channel".

The basic idea of the present invention is connecting per se known field devices in a very advantageous manner through the use of IO links and master assemblies. In this way, the full functionality of the field devices can be made use of while not requiring any additional expenditure for the device itself or for the installation. What is more, parameters for the parametrization of the field devices, diagnostic data for the determination of the device status or diagnostic information or switch-off signals can be transmitted via the IO link connection. Thus, as for example in the case of the power supply unit 500, signals for switching off the output voltage, and also signals for the safety-related [switch-off] of a single or of multiple output voltages can be transmitted via the IO link interface 510. Moreover, identification data of the devices and finally also safety protocols can be transmitted in a simple manner, so that safety installations are facilitated in a technically simple and therefore also cost-effective manner.

The invention claimed is:

1. An apparatus comprising:
   at least one power supply unit;
   a master assembly; and
   an IO link according to IEC International Standard 61131-9, the IO link linking the at least one power supply unit to the master assembly;
   wherein the power supply unit comprises an IO link interface or an IO link adapter;
   wherein at least one bit of process data is transmitted to the at least one power supply unit via the IO link, the one bit of process data forming a signal for safety-related switching off of a single output voltage or of multiple output voltages of the at least one power supply unit;
   wherein a bidirectional transmission of a safety protocol occurs between the at least one power supply unit and the master assembly, the safety protocol being transmitted via IO link data bits, so that the IO link serves as a black channel; and
   wherein an energy supply transfer takes place via the IO link.

2. The apparatus according to claim 1, further comprising a drive and frequency converter and a second IO link according to the IEC International Standard 61131-9, the second IO link linking the drive and frequency converter to the master assembly.

* * * * *